July 8, 1930. B. L. PADGETT 1,770,342
MEANS FOR AND METHOD OF PRODUCING CHARTS AND GRAPHIC REPRESENTATION
Filed July 26, 1929 4 Sheets-Sheet 3

Inventor
Benjamin Lewis Padgett
By Walter W Burns
Attorney

Patented July 8, 1930

1,770,342

UNITED STATES PATENT OFFICE

BENJAMIN LEWIS PADGETT, OF WASHINGTON, DISTRICT OF COLUMBIA

MEANS FOR AND METHOD OF PRODUCING CHARTS AND GRAPHIC REPRESENTATION

Application filed July 26, 1929. Serial No. 381,333.

This invention relates to means for and method of producing charts and graphic representation of studies of events where the relation of certain acts or distribution of commodities to other acts or distribution of commodities of a similar nature are desired.

In large business and government organizations, it has become a necessity in presentation of conditions before executives to make graphic studies which show at a glance the conditions which have been studied. Examples of these conditions which are to be represented are commodities handled, monies received and disbursed and petroleum produced and distributed. In the means for graphically illustrating these conditions, in common use, it is necessary to use not only the services of the skilled analyst, but also the services of a skilled draftsman, after which the charts or other productions are reproduced in multiple. In case of daily or weekly change, new charts have to be made or erasures made on the charts already constructed.

The primary object of this invention is the provision of an improved means for graphic representation wherein conditions can be quickly and accurately indicated for one study and changes afterward quickly and accurately made for the same or another study without destroying the representation means.

Another object of the invention is the provision of an improved graphic representation means having flexible strips to indicate conditions or multiples thereof.

Another and further object of the invention is the provision of strips having different characteristics to indicate at a glance the relative weights of the divisions of the representations.
Another and still further object of the invention is the provision of a chart board having means for holding divisions of the strip bundle in position on the board.

Another and still further object of the invention is the provision of means to facilitate the reproduction photographically by making square edges on the ends of strip bundle divisions and for destroying reflecting surfaces and shadows to produce a "flat" effect.

Another and still further object of the invention is the provision of different strip markings as by color or design to indicate different conditions so as to have them indicated after photographic reproduction.

Another and still further object of the invention is the provision of a plurality of unit boards whereby a larger or smaller study representation can be made with the same equipment.

Another and still further object of the invention is the provision of an improved method for producing charts which consists in placing on a board, a flexible-strip bundle of a thickness to indicate the total number or percentage of acts or commodities or other conditions to be considered, then separating one end of the bundle into groups to indicate sources and similarly treating the opposite end to indicate destination.

Another and still further object of this invention is the provision of such a method wherein a photograph is taken of the parts with the groups of strips aranged as desired.

Another and still further objects will be apparent to those skilled in the art from a reading of the complete specification and claims.

Referring to the drawing wherein I have illustrated an embodiment of my invention.

Figure 1 is a top perspective view of my invention showing it set up with a petroleum study.

My invention is adapted for use in practically all business and social endeavors, in fact where any study of conditions may be desired to be illustrated in a graphic form. These conditions which may be set forth are of various types. They may be percentages, commodities, as barrels of petroleum, or monies in dealing with fiscal matters.

Reference is made to my copending application Serial Number 361,245, filed May 7, 1929.

In order to make the scope of the invention clear, a number of specific applications of the invention will be called to attention.

In governmental work in its application to the work of the Commerce Department, one use is in the representation of the sources of production and importation of raw materials as compared with the distribution of the same, including exportation, for its destined use.

These conditions may be set forth in terms of the percentages, dollars involved, or in the units of production. Another use is in the illustration of the monies earned from the several sources as compared with the expenditures which were made for other commodities. It is useful also to illustrate the flow of any of the commodities which are studied by the Census Bureau.

In the Foreign and Domestic Commerce Bureau, the studies of exports and imports may be represented by this invention.

As applied to War and Navy Department activities, the invention is useful in studying mobilization and distribution, also procurement and supply.

In the analysis of the production and distribution of petroleum products and other mineral products, this invention lends itself to the use of the Bureau of Mines.

In the fiscal branches of the government, the incomes and expenditures may be represented by my invention and complete analysis quickly made.

The device is also useful in schools and higher institutions of learning in the departments of economics and finance.

In all of these and many other places, the use of this invention will save both time and equipment as the same material is used repeatedly.

In carrying out my invention in one form, I use a board 20 which may be made of any suitable material and of all one piece or in sections, $20^a$, $20^b$, $20^c$ and $20^d$. The board 20 is provided with small holes $20^f$ over its surface, preferably in rows one eighth of an inch apart, the holes of the rows being also one eighth of an inch apart. These holes are for the purpose of inserting small pins or pegs $20^e$ for a purpose to be later described.

A flexible-strip bundle 21 is composed of any suitable material of contrasting appearance characteristics relative to the board. If the board is made of transparent, translucent or white or light material, then the material composing the bundle should preferably be of a dark color. If however, the board be of wood painted black or similarly appearing material then the flexible-strip bundle can be of white or light material.

The bundle 21 should be composed of strips which are separable throughout a substantial portion of their length in order that groups of these strips may be used to represent a weight or evaulation in the chart as will later clearly appear. As illustrated, the bundle 21 is composed of thin white strips of cardboard of suitable length and of substantially one-half inch in width. The bundle as used, is placed so that the strips stand on edge—with the edges adjacent the surface of the board. The board in the embodiment illustrated is a wooden board painted a "flat" black as shown in Figure 1.

A convenient way of carrying out the process of graphic representation with this invention is to select a sufficiently wide bundle of the flexible strips representative of the value of the total conditions to be represented. For example, if the total amount of money to be represented on the chart were 500,000 dollars, a bundle of 500 strips might be selected. Then in this analysis, each strip would have a weight or value of 1,000 dollars. If the conditions to be represented and analyzed were percentages, a bundle of 500 strips might be selected wherein in the analysis, each strip would represent two tenths of one per cent.

To assist in the selection of the correct size of the bundle, it has been found desirable to provide a means having a different appearance characteristic at the end of a multiple of the strips, for example, each tenth strip may be of a different color or have a marking on it as shown at $21^a$. If two hundred strips are found to be the correct number, then it is only necessary to count twenty groups of ten strips and the correct number of the groups, during separation, is easily determined.

Figure 1:
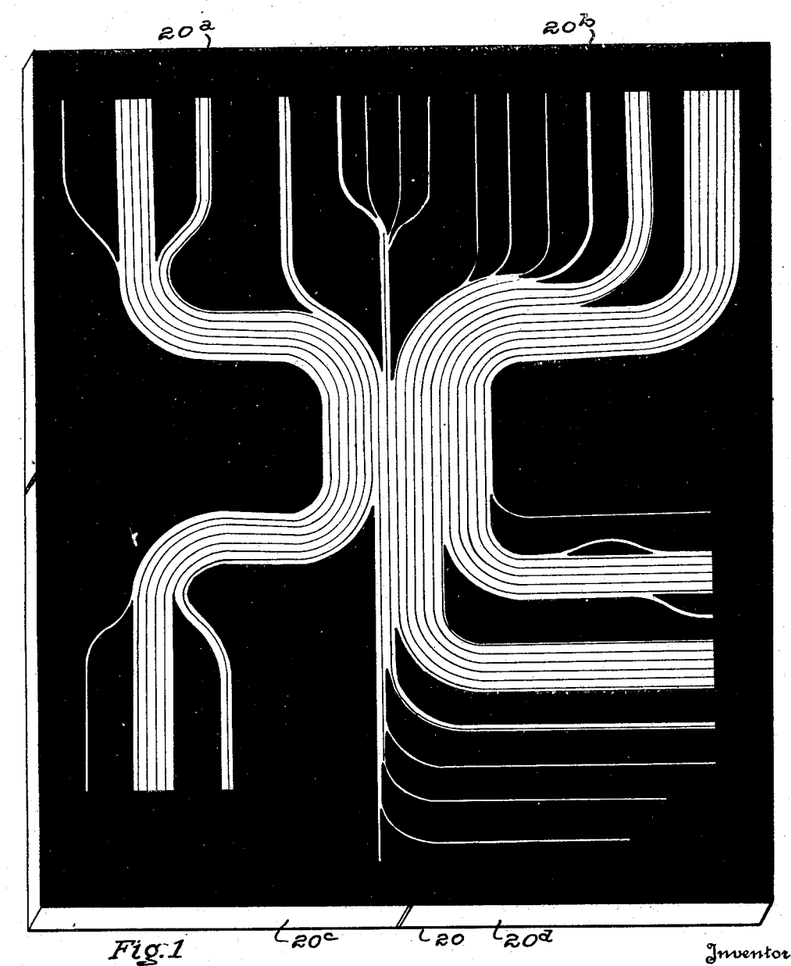
Figure 2:
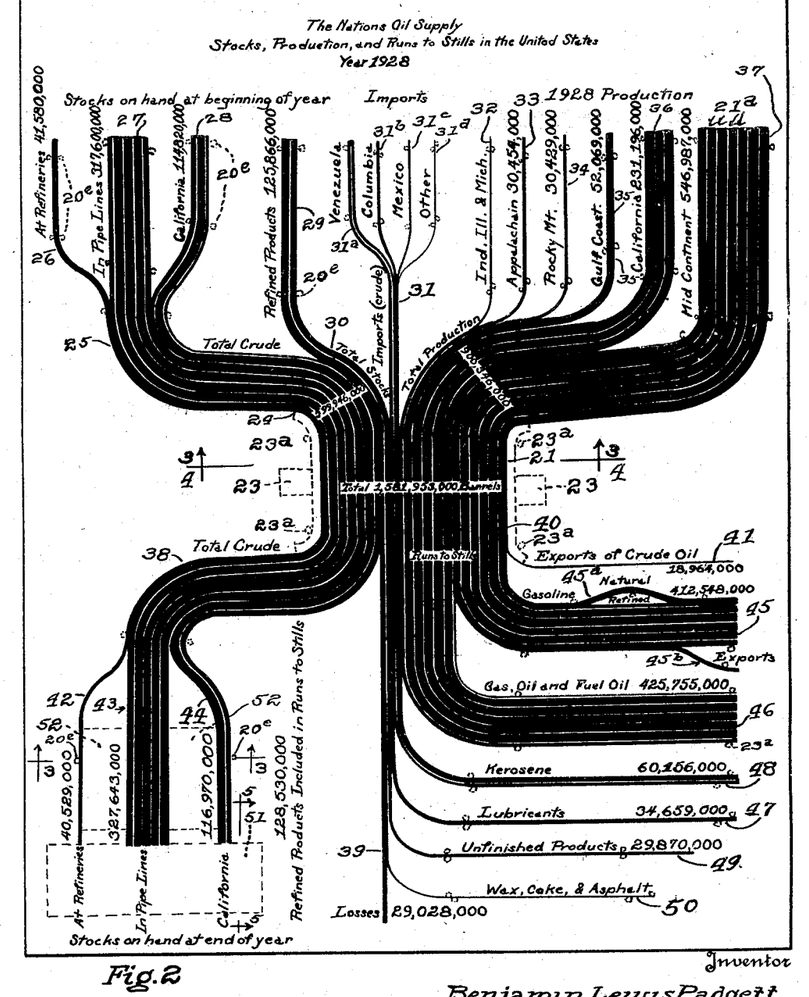
Figure 2 is a view of a photographic print showing the designations and explanations of the study and having indicated thereon certain features of the apparatus shown in Figure 1 which because of the dark surface cannot be well illustrated.
Figure 3:
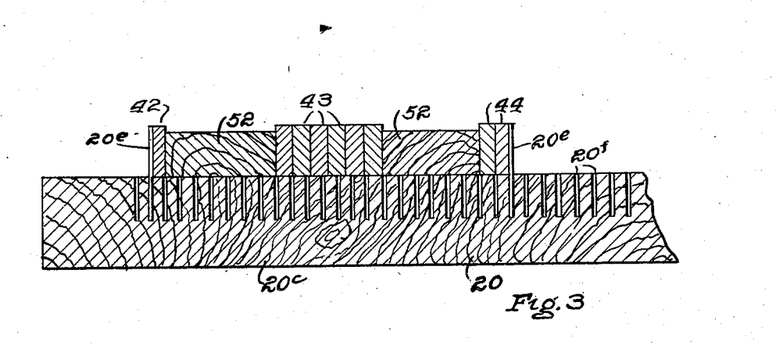
Figure 3 is a detail cross sectional view taken on Figure 1 at a place corresponding to the line 3—3 on Figure 2.
Figure 4:
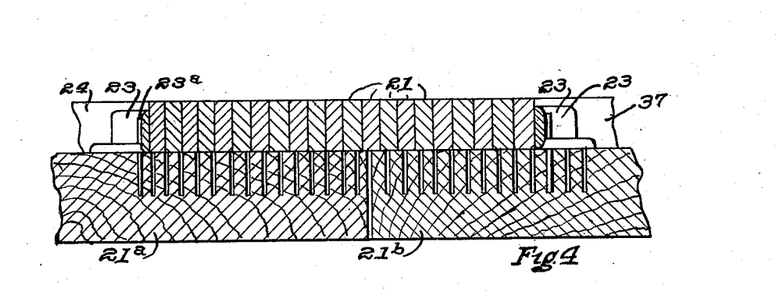
Figure 4 is a detail cross sectional view taken on Figure 1 at a place corresponding to the line 4—4 on Figure 2.
Figure 5:
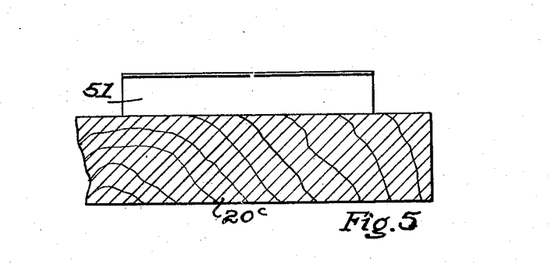
Figure 5 is a detail cross sectional view taken on Figure 1 at a place corresponding to the line 5—5 of Figure 2.

For the sake of clearance in illustration and description, I have indicated certain parts in Figure 2 which is a direct process photograph of Figure 1 wherein is shown the study set up on a black background as is done in the preferred way. These indications on the figure showing the photographic reproduction of the study, it will be understood, refer to parts on the actual study which cannot be well shown on the black background.

Having selected a bundle of the correct size, it is placed on the board, the edges upward. The order of arrangement of the parts on the board is immaterial as to results. It has, however, been found to be convenient, in making studies of the general type to be described, to secure the strip bundle adjacent its middle by the guides 23. These guides, two in number, are placed on each side of the bundle and in close relation thereto. The guides have curved ends to make gradual bends in the strips when the same are divided in groups, as will later clearly appear. These guides are secured in place by the use of securing pins or pegs 23ª, the latter being inserted in available holes in the board 20.

Let us assume that it is desired to make a graphic chart of the oil supply of the country for the year 1928 as to its sources and destinations, showing the various places from which the oil supply is taken and the various places to which it goes.

In selecting the size of bundle, I have selected 500 strips, each 25th strip having separate appearance characteristics. Each strip thus represents two tenths of 10 percent of the whole or approximately 3,000,000 barrels of oil.

The correct size bundle of strips 21 having been selected and secured in place by the guides 23 as above described, the sources of the oil supply will be first considered.

The first great group is the total stocks on hand at the beginning of the year. This is divided into two divisions, the crude products and the refined products. The crude products are divided into three groups, (1) at refineries, (2) the pipe line stocks and (3) the California storage stock.

From the left side of the strip bundle, the appropriate number of strips are separated to indicate the total number of barrels of crude oil on hand at the beginning of the year. These strips are then bent at the side as shown at 24 and then straight as shown at 25. Pegs are now used along the edge of these strips to hold them in place. At the outer left edge of the bundle an appropriate number of strips are separated as at 26 to represent the amount of crude oil (1) at refineries. Similarly a group of strips is taken of an appropriate size to indicate the number of barrels of crude oil (2) in the pipe line stocks as at 27 and an additional group to represent (3) the California storage stock as at 28. These groups are all secured in position by inserting pegs in the appropriate holes in the board.

In order to represent the refined products which form a part of the total stock on hand at the beginning of the year, an additional group of strips of an appropriate size is separated at the upper end of the bundle. This group which I have designated 29, is then secured in place by pegs. At 30, appears the graphic representation of the total stock on hand at the beginning of the year.

Another source of supply for the country is in the imports. This I have represented at 31. This group 31 is of an appropriate size and is separated at the upper end from the main bundle and is secured in place by the pegs already described.

The import group 31 is also subdivided into sub-groups to indicate the sources of imports as at 31ª from Venezuela, 31ᵇ from Colombia, 31ᶜ from Mexico and 31ᵈ from all other foreign countries.

The entire remainder of the strips of the bundle represent the total production for the year. At the upper ends of the strips, groups in this total production remainder, are separated into the geographical sub-divisions as Indiana, Illinois and Michigan to form strip group 32. The Appalachian group 33 is adjacent the Indiana group. The Rocky Mountains 34, is next, followed in turn by the Gulf Coast, California and Mid Continent groups 35, 36 and 37, respectively, each having its appropriate number of strips to represent the number of barrels to appear on the chart. It is now clear that all of the sources of oil for the year 1928 are graphically represented.

I will now describe the representations for the destinations.

In order to indicate the distribution of the oil, I have divided it into three groups. The first group is the crude oil on hand at the end of the year, as shown at 38; the second is the part of the oil which has passed to the stills as shown at 40 and the third are the exports of crude oil as shown at 41.

In the group of oils on hand, we have three sub-divisions, the representations of the amounts of oils at (1) the refineries as shown at 42, (2) the pipe line stocks, as shown at 43 and (3) the California stock as shown at 44.

Aside from the losses in refining which is shown at 39, the oils which are represented as having gone to the stills are in six sub-groups of strips indicating the products as (1) gasoline, shown at 45, (2) gas oil and fuel oil as at 46, (3) lubricating oil, as at 47, (4) kerosene, as at 48, (5) unfinished products, as at 49, (6) wax, coke and asphalt, at 50.

It is to be noted that a portion of the gasoline is sub-divided as natural gasoline, the remainder being refined. The former is designated by the character 45ª. It will also be seen that a portion of the gasoline is exported.

This representation has been designated by the character 45$^b$.

The representations of all of these destination quantities are separated from the lower end of the bundle and separately placed and secured by pegs as already described for the source groups.

In order to show the ends of the strips in the finished representation as ending at the desired place, I place over the ends of the strips, a piece of paper or other flexible material which preferably has the same general appearance characteristics as the board. In this way when photographed, as will be later described, the appearance on the photograph indicates that the strips had actually ended there. See the dotted lines indicating the flexible cover material at 51.

In the use of the device I have found it a convenience to use strips in separating groups and sub-groups as shown by the dotted lines at 52. These strips are preferably made of wood or other light material and are painted or otherwise colored to give the same appearance characteristics as the board. For example, if the strips are of wood, they may be painted a dead flat black, if the board is so painted. The strips may be made of various lengths and widths, it being usually unnecessary to have more than one thickness.

A feature of the graphic representation made with my invention, is that certain relations are plainly visible upon inspection. For example, if it is desired to have a visual comparison between the total crude stock on hand January 1, 1928 and the total crude stock on hand January 1, 1929, one glance at the two bands of the total crude representations shows clearly the stock on hand on January 1, 1928 was only slightly less than the total crude stock on hand January 1, 1929.

In this connection, attention is called to the fact that the multiple-indicating lines assist in this visual comparison.

In carrying out my invention, I have found it convenient to have the board and the other parts, not desired to show in the diagram, of black as already described and to have the bundle of strips of white material.

The advantage of this is that when the whole is photographed, which is the next and final step, a black and white print may be made directly with the black diagram showing on a white background. This permits the use of ordinary photographic methods to produce the white background print without going through the step of making a negative.

An advantage of this invention is that the same equipment may be used, the graphic representation being changed each day or hour, if necessitated. The changes do not involve either erasures or destruction or replacement of any of the equipment. If a complete record is needed, a photograph or photographs may be made at regular time intervals or whenever a change is made. If it should be found, in some instances, that a large number of prints are needed, a negative print may be made from the first directly made positive print and then other positive prints made.

Figure 6:
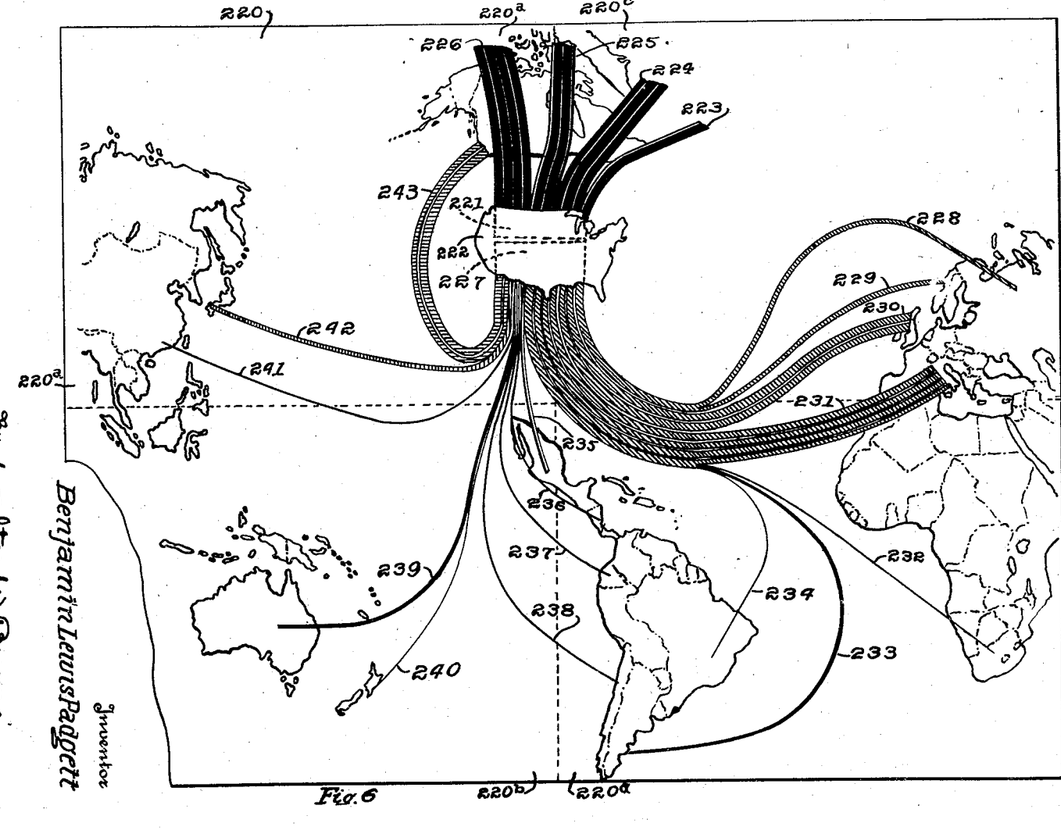
Figure 6 represents the adaptation of the invention to the study of the exports from the United States for the year 1928 and is a view of a direct process photographic reproduction of the device after the completion of the graphic analysis.

In Figure 6, I have illustrated a study of the total exports from the United States, of merchandise to principal countries throughout the world during the year 1928.

As I have clearly described the detailed process and method of use of my invention; in describing this adaptation to a map, I will, for the sake of clearness and brevity describe the use with the map, by showing the completed photographic copy of the study. This is done for the reason that in the present preferred form, I use a black board which is difficult of illustration in a drawing. The features will be indicated in Figure 6 and it will be understood that these are used with the board when the study is being set up.

Since the distances travelled are not taken into account and since the relative positions of the countries do not matter in such a study, I have, for the sake of clearness, separated the map of North America into three parts.

These separated parts have been spaced to better illustrate the exports for the size of map used.

Let us assume that of the exports from the United States for the year 1928, there are three principal sources—about 13% from the food producing industries, 25% from the textile industries and 25% from the machinery manufacturies—the other 37% of the exports being from miscellaneous industries.

In the study illustrated, the sources of the exports, that is from the different industries, have been indicated by white strips, the exports over the Atlantic routes by green, over the Pacific routes, by red and to Canada by blue.

In setting up the study maps, the maps of Europe, Africa, South America, Asia, Australia, Canada and Mexico were placed upon the black board which as photographed directly appears as a white back-ground at 220. This black board is in four sections as indicated at 220$^a$, 220$^b$, 220$^c$ and 220$^d$ and is provided with small holes in its surface as already described for the board 20.

The maps of Canada and Mexico are shown as being separated for the purpose of clearness.

In the construction of the export sources indications, two hundred was the number of strips arbitrarily taken, there being one black strip placed as the twentieth strip and each multiple of twenty. This places one black strip to indicate the boundary of each 10% of the exports. In indicating the sources, the two hundred strips were bound together as indicated at 221 and secured in place at a point to be occupied by the map of the United States, as at 222.

The appropriate number of strips at the outer end are separated, as at 223, to represent the 13% of the whole U. S. exports for the year. This 13% of the whole represents the food products exported from the United States during the year.

These are bent as shown and black strips placed on each side to destroy shadows and reflection. These strips are now secured in place by means of the pins in coaction with the walls of the holes in the board.

An appropriate number of strips to indicate the textile products exports which are 25% of the whole exports, is now separated at the outer end of the strip bundle. After shielding the strips with black strips to destroy the reflections and shadows, the separated bundle section is pinned in its place as shown at 224.

This operation is repeated for the strips to represent the machinery exports and for the miscellaenous exports as shown at 225 and 226, respectively.

The sources of the exports as to manufacture, have now been indicated. As white strips are used for these source indications, they will show dark or black on the photograph in direct processes.

In order to show the relation between the different exports and their destinations, I select the same number of strips as were used in the sources indications. These two hundred strips with each twentieth strip, a black one, are bound together at one end to form a bundle and the bundle placed on the board with the end abutting the end of the first bundle and at a point to be occupied by the map of the United States as shown by dotted lines at 227.

This bundle to show the use of the colors in using strips, is in three color groups. Blue strips are used to indicate exports to Canada, red strips are used to indicate exports to points on the Pacific, including Mexico and green is used to indicate exports to all points on the Atlantic, including Europe, Africa and all Atlantic ports of South America. In the photographic process, these colors show of different shades and may easily be differentiated.

After the end of the strip bundle has been put in place, it is suitably secured by placing the pins at the sides in the holes in the board. The map of the United States is now placed in place over the abutting ends of the strip bundles and suitably secured in place, as by pins. These two bundles when in position become a single bundle in two parts, for the purpose of the study.

In forming that portion of the whole bundle to represent the destinations of the exports, the divisions of the colored strips are made so that the proper number of each color will be provided in the respective groups.

The free ends of the strips are now separated into their groups to represent the exports to the several destinations and are stripped with black strips at their sides and secured in proper place to indicate the proper destination.

For example, beginning on the green side, the group 228 represents the exports to Russia, the group 229 represents the exports to Norway and Sweden, the group 230 represents the exports to the British Isles and the group 231 represents the exports to Central and Southern Europe.

In the Southern Atlantic, the group 232 represents the exports to South Africa, the group 233 represents the exports to the Argentine Republic and the group 234, the exports to Brazil.

On the Pacific side, the red strips of the bundle are divided proportionally to the exports to the several principal countries, the group 235 representing the exports to Mexico, the group 236 representing the exports to Central American countries, the group 237 representing the exports to Colombia, the group 238, to Chile, the group 239, the exports to Australia, the group 240, the exports to New Zealand, the group 241, the exports to China and the group 242, the exports to Japan.

The blue group designated 243, represents the exports to Canada.

All of these groups are provided with pins to hold them in place, the pins being inserted in the holes of the board 220 as earlier described. They are also provided with black strips on their sides to eliminate shadows and reflections.

In order to provide shields for the ends of the strips, map sections may be raised above the strip ends as in the case of the map of the United States shown at 227 and which is illustrated as over the ends of the strips which form the two sections of the whole strip bundle.

While I have shown and described in detail, a modification of my invention with two uses therefor, I desire to have it understod that the showing is merely illustrative and that the invention is adapted for an indefinite number of uses, and that modifications and changes may be made without departing from the spirit of the invention and within the scope of the appended claims.

Having described my invention what I claim and desire to secure by Letters Patent is:—

1. Graphic representation means comprising, in combination, a board and a bundle of flat flexible strips with their flat sides in juxtaposition to corresponding sides of adjacent strips and of a contrasting appearance and having the ends of the strips freely movable, with relation to each other, at one end of the bundle.

2. Graphic representation means comprising, in combination, a board and a bundle of flat flexible strips with their flat sides in juxtaposition to corresponding sides of adjacent strips and of a contrasting appearance, the strips of the bundle being freely movable at their ends relative to each other, at the ends of the bundle.

3. Graphic representation means comprising, in combination, a board and a bundle of flat flexible strips with their flat sides in juxtaposition to corresponding sides of adjacent strips and of a contrasting appearance and having the strips separable with relation to each other throughout a substantial portion of their length.

4. Graphic representation means comprising, in combination, a board and a bundle of flat flexible strips with their flat sides in juxtaposition to corresponding sides of adjacent strips and of a contrasting appearance and having the strips separable with relation to each other throughout a substantial portion of their length, the bundle being provided with means at regular intervals across the width of the bundle to indicate multiples of the strips.

5. Graphic representation means comprising, in combination, a board and a bundle of flat flexible strips with their flat sides in juxtaposition to corresponding sides of adjacent strips and of a contrasting appearance and having the strips separable with relation to each other throughout a substantial portion of their length to form groups, the bundle having strips of a different color spaced across the bundle at regular intervals, to indicate at a glance the relative weight of one group to another.

6. Graphic representation means comprising, in combination, a board, and a bundle of flat flexible strips with their flat sides in juxtaposition to corresponding sides of adjacent strips and of a contrasting appearance and having the strips separable with relation to each other throughout a substantial portion of their length, the board being provided with scales having a relation to the thickness of the strips of the bundle.

7. Graphic representation means comprising, in combination, a board and a bundle of flat flexible strips with their flat sides in juxtaposition to corresponding sides of adjacent strips and of a contrasting appearance, and having the strips separable with relation to each other throughout a substantial portion of their length, the board being in component sections.

8. Graphic representation means comprising, in combination, a board, a flexible-strip bundle of a contrasting appearance having the strips separable into groups throughout a substantial portion of their length, shield means for the exposed sides of the strips to prevent the appearance of shadows and reflecting surfaces at the sides of the strips and other shield means of appearance characteristics similar to the board and across the ends of the groups of strips to make their ends appear to be along a desired line.

9. Graphic representation means comprising in combination, a board, a flexible-strip bundle of a contrasting appearance having the strips separable with relation to each other throughout a substantial portion of their length, and shield means for the exposed sides of the strips to prevent the appearance of shadows and reflecting surfaces at the sides of the strips.

10. Graphic representation means comprising, in combination, a board, a flexible-strip bundle of a contrasting appearance having the strips separable into groups of strips throughout a substantial portion of their length, shield means of appearance characteristics similar to the board and across the ends of the groups of strips to make their ends appear to be along a desired line.

11. Graphic representation means comprising, in combination, a board, a bundle of flat flexible strips with their flat sides in juxtaposition to corresponding sides of adjacent strips and of a contrasting appearance having the strips separable with relation to each other, throughout a substantial portion of their length and means including pegs and stiff guides of the appearance characteristics of the board, to hold the strips in desired position on the board.

12. Graphic representation means comprising, in combination, a board, a bundle of flat flexible strips with their flat sides in juxtaposition to corresponding sides of adjacent strips and of a contrasting appearance having the strips separable with relation to each other, throughout a substantial portion of their length and means including pegs to hold the strips in desired position on the board.

13. Graphic representation means comprising, in combination, a board, a bundle of flat flexible strips with their flat sides in juxtaposition to corresponding sides of adjacent strips and of a contrasting appearance having the strips separable with relation to each other, throughout a substantial portion of their length and means including stiff guides of the appearance characteristics of the board, to hold the strips in desired position on the board.

14. Graphic representation means comprising, in combination, a board, a plurality of bundles of an appearance contrasting to the board, the strips of the bundles of flat flexible strips with their flat sides in juxtaposition to corresponding sides of adjacent strips and being separable from each other throughout a substantial portion of their length.

15. Graphic representation means comprising, in combination, a board, a bundle of flat flexible strips with their flat sides in juxtaposition to corresponding sides of adjacent strips and having different sections of appearances contrasting to the board and to each other, the strips of each section of the bundle being separable from strips of the same section throughout a substantial portion of their length.

16. The method of graphic chart construction which consists in arranging a bundle of flat, side by side flexible strips on a board of contrasting apearance so that the strips at one point will be held together to indicate the total evaluation of the conditions considered, and the arrangement of the strips adjacent one end of the bundle in groups, of sufficiently large number of strips in the respective groups, to indicate the evaluation of the conditions represented by those groups.

17. The method of graphic chart construction which consists in arranging a bundle of flat, side-by-side flexible strips on a board of contrasting appearance so that the strips adjacent one end will be in groups of sufficiently large number of strips in the respective groups to indicate the evaluation of the respective source conditions to be represented, the strips being held together at a point intermediate the ends to indicate the total evaluation of the conditions considered and the opposite ends of the strips being arranged in groups, of sufficiently large number of strips in the respective groups, to indicate the evaluation of the conditions at the respective destinations.

18. The method of graphic chart construction which consists in arranging a bundle of flat, side-by-side flexible strips on a board of contrasting appearance so that the strips adjacent one end will be in groups of sufficiently large number of strips in the respective groups to indicate the evaluation of the respective source conditions to be represented, the strips being held together at a point intermediate the ends to indicate the total evaluation of the conditions considered and the opposite ends of the strips being arranged in groups, of sufficiently large number of strips in the respective groups, to indicate the evaluation of the conditions at the respective destinations, and the photographing of the strips so arranged.

19. The method of graphic chart construction which consists in arranging a bundle of flat, side-by-side flexible strips on a board of contrasting appearance so that the strips adjacent one end will be in groups of a sufficiently large number of strips in the respective groups to indicate the evaluation of the respective source conditions to be represented, the strips being held together at a point intermediate the ends to indicate the total evaluation of the conditions considered and the opposite ends of the strips being arranged in groups, of sufficiently large number of strips in the respective groups, to indicate the evaluation of the conditions at the ends of the destinations, the covering of the ends of the groups with a material of the appearance characteristics of the board and the photographing of the strips so arranged.

20. The method of making graphic representations which consists of illustrating values of the sources of conditions by a plurality of flexible bands of proportional width, relative to the values represented, of bringing the bands together to form a band of the width of the combined bands to illustrate the value of these combined conditions and dividing the wide band to form other destinational divisional bands of a width proportional to each other and to the conditions represented.

21. The method of preparing a graphic chart which consists in mounting upon a support adapted to form a suitable background a plurality of elongated adjustable members adapted to represent upon said background lines of various widths, arranging said elongated members in groups in such a manner that each group of members is of a suitable proportional width to the other to graphically represent the quantities desired, and then photographing the group or groups of members thus arranged.

22. The method of preparing a graphic chart which consists in mounting upon a support adapted to form a suitable background a plurality of elongated flexible members adapted to be adjusted upon said background to represent lines of various widths, said members being first mounted in relatively compact body; deflecting subordinate groups of said members from the main body; securing said deflecting members in such a deflected position; and then photographing said member upon said background.

23. In a graphic chart, a support having a face portion adapted to form a background, and a plurality of elongated flat, side-by-side, flexible members adapted to be adjustably mounted upon said background in a formation suitable for photographic reproduction to produce a chart.

24. In a graphic chart, a support, a plurality of flexible strips adapted to be secured to said support in an edgewise position, means for removably securing said body of strips to said support at a point spaced away from the ends of said body, the end portions of said strips being adapted to be deflected from the main body thereof, and means adapted to support in an adjusted position deflected end portions of said body of strips.

25. In a graphic chart, a support having a face portion, a bundle of flat flexible strips having end portions in which subordinate groups of said strips are adapted for lateral deflection, means for securing said bundle and subordinate groups of strips to said support, and removable pins adapted to support the deflected portions of said bundle of strips in adjusted positions.

26. In a device of the class described, a support provided with a dark colored face portion, a plurality of flexible strips mounted in an edgewise position upon said face portion, said strips being adapted for grouping and for lateral deflection, the edges of said strips being of a light color and their sides being of a dark color which corresponds with the color of the face portion of said support, and means for maintaining said strips in adjusted position.

In testimony whereof I hereunto affix my signature.

BENJAMIN LEWIS PADGETT.